Patented Nov. 30, 1948

2,455,114

UNITED STATES PATENT OFFICE 2,455,114

PROCESS OF PROTECTING METAL SURFACES

Emerson Gillmore Cobb, Mitchell, S. Dak., assignor to United Aircraft Corporation, East Hartford, Conn., a corporation of Delaware No Drawing. Application February 26, 1945, Serial No. 579,883

1 Claim. (Cl. 117—132)

This invention relates to a liquid coating composition and process that is particularly useful for coating parts of internal combustion engines for the purpose of protecting the same against corrosion. The coating is very useful in connection with aircraft engines.

Heretofore attempts have been made to protect such parts by coating them with different sorts of coating materials, but the results have not been entirely satisfactory because it was very difficult or practically impossible to apply such coatings in such a manner that they were uniform. The coatings themselves did not indicate by their appearances what the thicknesses thereof were at different places. Also, attempts have been made to add dye to clear resin solution used for coating parts of internal combustion engines, but the results have been that the presence of the dye caused the resin coatings to become brittle and lose their adhesiveness so that they peeled off.

It has been found for instance that rhodamine B base, Prussian Blue and other dyes deleteriously affect the flexibility, adhesiveness and toughness of baked coating materials such as synthetic resins when they are added thereto, so that these and other dyes are precluded from being used in clear coating compositions to impart color thereto when such compositions need to be colored as an aid in applying the proper thickness of coating thereof to surfaces that are to be subjected to heat.

By the present invention liquid coating compositions are provided which can be sprayed upon the parts of internal combustion engines that are to be protected against corrosion, so that the operator is informed by the spraying composition itself during the spraying operation as to the thickness of the layer upon any portion of the coated surface. Therefore the operator can conveniently regulate the thickness of the layer and vary it at different places in accordance with needs, or keep it quite uniform where desired.

In carrying out this invention a clear liquid resin solution is used and a colored dye is mixed therewith so that when the composition is being sprayed upon the engine parts the thickness at different places can be regulated within practical tolerances by watching the depth of color of the layer as the spraying proceeds.

The specific composition which has been discovered to fulfill the requirements necessary for a coating that is capable of giving indication per se, while it is being sprayed on, as to thickness of the layer, so that different thicknesses can be applied by the operator where needed, is a liquid phenol-formaldehyde resin solution in which aurine has been dissolved. Aurine is a dye, p-roso'ic acid, 4'-4" dihydroxy fuchsone, $C_{19}H_{14}O_3$ having the structural formula

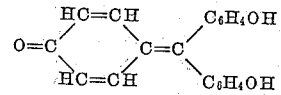

As a specific example of carrying out the invention a solution or thinner is prepared containing about 25 parts of phenol-formaldehyde resin, 45 parts of amyl or butyl alcohol, 12 parts of denatured ethyl alcohol and 18 parts of amyl acetate, by weight. Aurine dye is dissolved in alcohol in the proportion of 5.68 gms. of dye to 100 ml. alcohol and the alcohol solution of the dye is then added to the resin solution in the proportion of 100 ml. to a gallon, and filtered. The proportions of the compounds to the thinner may be varied, for example, by using 52% of butyl alcohol, 30% of amyl acetate and 18% of cellulose acetate. Also, other mixtures and ingredients as well as other thinners may be used.

A satisfactory way of applying this composition to engine parts is to spray the same at room temperature using a solution having a viscosity of about 12 to 15 seconds No. 4 Ford Cup. Due to the presence of the colored dye the operator can regulate the thickness of the coating and the area covered while he is spraying the solution by watching the depth of color of the same. In this way he can easily apply the coating so as to obtain the proper extent and depth of the same over all the surfaces that are to be protected by the coating material. The coating is then air dried for about fifteen minutes to remove very volatile constituents before heating. The air dried coating has a pinkish color. After the coating has been air dried the coated part is heated. A suitable way to heat the coating is to heat it in an oven at a temperature between about 325° F. and 400° F. The time of heating varies in accordance with the oven temperature and the size and surface of the article. About 20 minutes at 350° F. is sufficient for small articles. The baked coating has an amber-bronze appearance similar to that obtained when a coating of undyed resin is baked. This baked coating is cured or polymerized and is unaffected by solvents such as alcohols, ketones, chlorinated hydrocarbons, aliphatics, aromatics and esters such as butyl or amyl acetates which affect the uncured resin.

The hardened or baked resin containing the aurine has about the same color as the baked resin has without the aurine being added. The presence of the aurine does not adversely affect properties or characteristics of the coating such as toughness, flexibility or adhesiveness to surfaces to which it is applied.

The phenol-formaldehyde resin used in making the composition may be modified when desired with a plasticiser such as castor oil, linseed oil, dibutyl phthalate, tri-cresyl phosphate and vinyl resins, for example, when desired without departing from the invention.

What is claimed is:

The process of protecting a metal surface, which comprises the steps of preparing a coating solution consisting substantially of a clear resin solution containing about 25% by weight of unpolymerized phenol-formaldehyde resin with the balance substantially made up of organic solvent for said resin, to which is added aurine in the proportion of about 100 ml. of an aurine solution per gallon of said clear resin solution, wherein said aurine solution is prepared in the proportion of about 5.68 gm. aurine to 100 ml. alcohol, the coating solution as thus prepared having a color, when applied as a film coating to a metal surface, which is a function of the thickness of such coating; spraying said coating solution onto the metal surface to be protected to a predetermined thickness, indicated as a function of the color of the applied coating; thereafter air drying the coating to reduce the solvent content thereof; and then baking the coated metal surface at a temperature in the range of about 325° F. to about 400° F. to polymerize the phenol-formaldehyde to form the final coating, the color of the final baked coating being substantially the same as the final coating would be without the aurine added.

EMERSON GILLMORE COBB.

REFERENCES CITED

The following references are of record in the file of this patent:

UNITED STATES PATENTS

| Number | Name | Date |
|---|---|---|
| 957,137 | Balkeland | May 3, 1910 |
| 1,113,926 | Beatty | Oct. 13, 1914 |
| 2,010,123 | Woodruff | Aug. 6, 1935 |
| 2,090,938 | Conrad | Aug. 24, 1937 |
| 2,307,588 | Jackson et al. | Jan. 5, 1943 |
| 2,325,531 | Mertens | July 27, 1943 |

FOREIGN PATENTS

| Number | Country | Date |
|---|---|---|
| 285,058 | Great Britain | Mar. 7, 1929 |

OTHER REFERENCES

Rowe's Color Index, 1924, page 185, item #724.